United States Patent
Malladi et al.

(10) Patent No.: US 8,913,695 B2
(45) Date of Patent: Dec. 16, 2014

(54) HYBRID PILOT CONFIGURATION

(75) Inventors: Durga Prasad Malladi, San Diego, CA (US); Dung N. Doan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 12/045,501

(22) Filed: Mar. 10, 2008

(65) Prior Publication Data

US 2008/0225993 A1   Sep. 18, 2008

Related U.S. Application Data

(60) Provisional application No. 60/894,449, filed on Mar. 12, 2007.

(51) Int. Cl.
*H04L 27/06* (2006.01)
*H04L 5/00* (2006.01)
*H04L 25/02* (2006.01)

(52) U.S. Cl.
CPC .............. *H04L 5/005* (2013.01); *H04L 5/0051* (2013.01); *H04B 2201/70701* (2013.01); *H04L 25/0224* (2013.01); *H04L 5/0007* (2013.01)
USPC ........................................................ 375/340

(58) Field of Classification Search
CPC .................................................... H04L 5/0048
USPC ........................................................ 375/340
See application file for complete search history.

(56) References Cited

U.S. PATENT DOCUMENTS

| | | | | |
|---|---|---|---|---|
| 5,787,079 | A   * | 7/1998  | Bateman et al. | 370/343 |
| 2007/0036066 | A1  | 2/2007  | Thomas et al. | |
| 2007/0189240 | A1* | 8/2007  | Cho et al. | 370/337 |
| 2007/0293172 | A1* | 12/2007 | Shi et al. | 455/187.1 |
| 2008/0212701 | A1* | 9/2008  | Pan et al. | 375/260 |
| 2009/0296563 | A1  | 12/2009 | Kishiyama et al. | |

FOREIGN PATENT DOCUMENTS

| | | |
|---|---|---|
| EP | 1898542 A1 | 3/2008 |
| EP | 1906571 | 4/2008 |
| RU | 2172067 | 8/2001 |
| RU | 2235430 | 8/2004 |
| WO | WO9631014 | 10/1996 |
| WO | WO9922454 A2 | 5/1999 |
| WO | WO2006134949 A1 | 12/2006 |
| WO | 2007020710 | 2/2007 |

OTHER PUBLICATIONS

International Search Report—PCT/US08/056715—International Search Authority, European Patent Office, Oct. 2, 2008.

(Continued)

*Primary Examiner* — Michael Neff
(74) *Attorney, Agent, or Firm* — Anthony R. Morris

(57) ABSTRACT

Systems and methodologies are described that facilitate employing a hybrid pilot configuration in a wireless communications network. A hybrid pilot configuration includes common pilot symbols and dedicated pilots multiplexed together within a time transmission interval. The multiplexed pilot symbols can be received and utilized to demodulate channels. Common pilot symbols can be employed to demodulate control channels and dedicated pilot symbols can be utilized to demodulate data channels. Moreover, the dedicated pilot symbols can be employed to generate a channel estimate. The common pilot channels can be utilized in combination with the dedicated pilot symbols to augment the channel estimate.

36 Claims, 11 Drawing Sheets

(56) References Cited

OTHER PUBLICATIONS

Written Opinion—PCT/US08/056715—International Search Authority, European Patent Office—Oct. 2, 2008.

NTT DOCOMO: "Pilot Channel and Scrambling Code in Evolved UTRA Downlink,"3GPP TSG-RAN WG1 Meeting Ad Hoc Lte, vol. R1-050589, Jun. 20, 2005, pp. 1-24.

Taiwan Search Report—TW097108718—TIPO—Mar. 30, 2012.

* cited by examiner

HYBRID PILOT CONFIGURATION

CROSS-REFERENCE TO RELATED APPLICATIONS

This application claims the benefit of U.S. Provisional Patent application Ser. No. 60/894,449 entitled "A METHOD AND APPARATUS FOR USING A DEDICATED PILOT STRUCTURE FOR DOWNLINK" which was filed Mar. 12, 2007. The entirety of the aforementioned application is herein incorporated by reference.

BACKGROUND

I. Field

The following description relates generally to wireless communications, and more particularly to hybrid pilot configurations.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. With many devices transmitting signal data in proximity, resource allocation and power control are important for devices to ensure sufficient signal-noise ratio and data rate in communications. Thus, broadband pilot signals can be sent by devices allowing measurement of signal quality in transmission that can be utilized to allocate additional resources and/or request additional power in subsequent transmissions.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for utilizing hybrid pilot mode in a wireless communications network is described herein. The method can comprise receiving a transmission in a transmission time interval that includes multiplexed common pilot symbols and dedicated pilot symbols. In addition, the method can include utilizing the common pilot symbols to demodulate control signals on at least one control channel. The method can also comprise employing the dedicated pilot symbols to demodulate data signals on at least one data channel.

Another aspect relates to a wireless communications apparatus that can comprise a memory that retains instructions related to receiving a transmission in a transmission time interval that includes multiplexed common pilot symbols and dedicated pilot symbols, utilizing the common pilot symbols to demodulate control signals on at least one control channel and employing the dedicated pilot symbols to demodulate data signals on at least one data channel. The wireless communications apparatus can also include a processor coupled to the memory and configured to execute the instructions retained in the memory.

Yet another aspect relates to a wireless communications apparatus that facilitates utilizing a hybrid pilot mode in a wireless communications network. The apparatus can include means for receiving a transmission in a transmission time interval that includes multiplexed common pilot symbols and dedicated pilot symbols. In addition, the apparatus can include means for utilizing the common pilot symbols to demodulate control signals on at least one control channel. The apparatus can further comprise means for employing the dedicated pilot symbols to demodulate data signals on at least one data channel.

Still another aspect relates to machine-readable medium having stored thereon machine-executable instructions for receiving a transmission in a transmission time interval that includes multiplexed common pilot symbols and dedicated pilot symbols. The machine-readable medium can further comprise instructions for utilizing the common pilot symbols to demodulate control signals on at least one control channel. In addition, the machine-readable medium can include instructions for employing the dedicated pilot symbols to demodulate data signals on at least one data channel.

According to another aspect in a wireless communication system, an apparatus can comprise an integrated circuit. The integrated circuit can be configured to receive a transmission in a transmission time interval that includes multiplexed common pilot symbols and dedicated pilot symbols. The integrated circuit can further be configured to utilize the common pilot symbols to demodulate control signals on at least one control channel. In addition, the integrated circuit can be configured to employ the dedicated pilot symbols to demodulate data signals on at least one data channel.

According to yet another aspect, a method for employing a hybrid pilot mode in a wireless communications network is described herein. The method can comprise multiplexing common pilot symbols with dedicated pilot symbols in a transmission time interval. In addition, the method can include transmitting the multiplexed pilot symbols to at least one mobile device.

Another aspect described herein relates to a wireless communications apparatus that can include a memory. The memory can retain instructions related to multiplexing common pilot symbols with dedicated pilot symbols in a transmission time interval and transmitting the multiplexed pilot symbols to at least one mobile device. In addition, the wireless communications apparatus can include a processor coupled to the memory and configured to execute the instructions retained in the memory.

Yet another aspect relates to a wireless communications apparatus that facilitates employing a hybrid pilot mode in a wireless communications network. The apparatus can comprise means for multiplexing common pilot symbols with dedicated pilot symbols in a transmission time interval. Further, the apparatus can comprise means for transmitting the multiplexed pilot symbols to at least one mobile device.

Still another aspect relates to a machine-readable medium having stored thereon machine-executable instructions. The machine-readable medium can comprise instructions for multiplexing common pilot symbols with dedicated pilot symbols in a transmission time interval. In addition, the machine-readable medium can include instructions for transmitting the multiplexed pilot symbols to at least one mobile device.

A further aspect described herein relates to an apparatus in a wireless communication system comprising an integrated circuit. The integrated circuit can be configured to multiplex common pilot symbols with dedicated pilot symbols in a transmission time interval. In addition, the integrated circuit can be configured to transmit the multiplexed pilot symbols to at least one mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
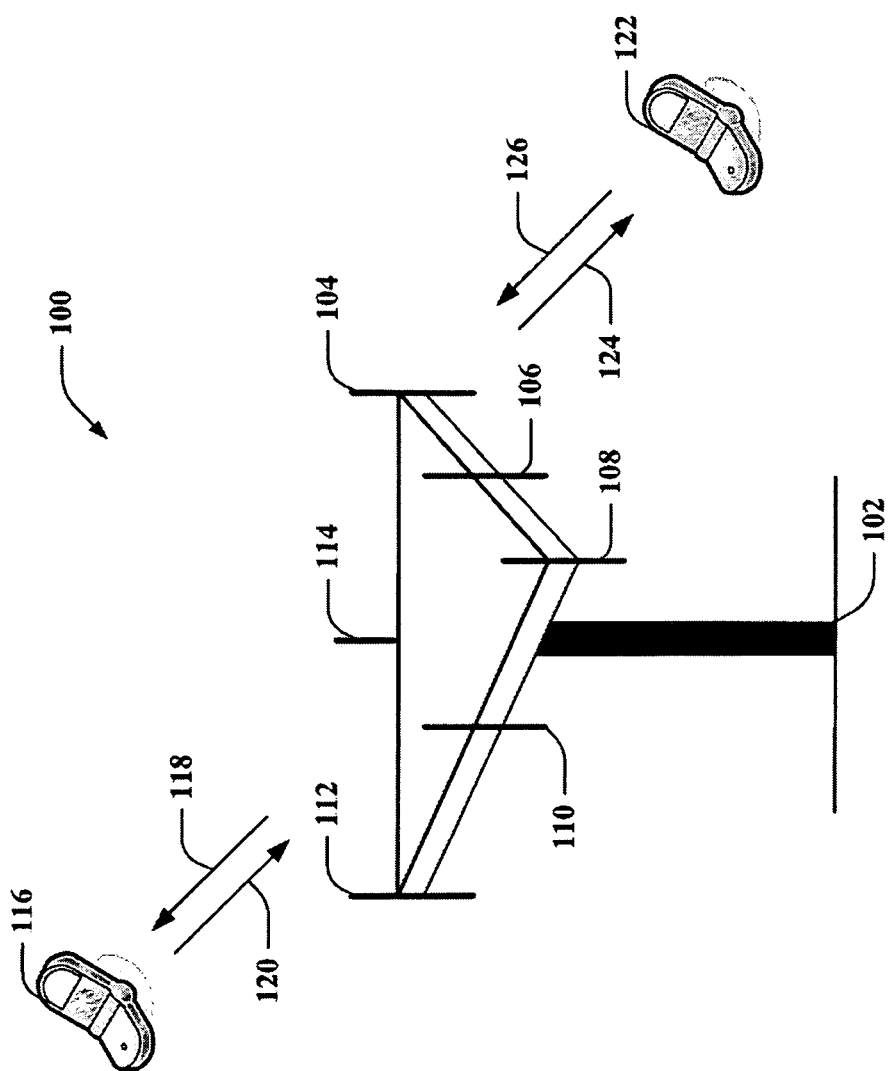
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

According to an example, system 100 can be a multiple-input multiple-output (MIMO) communication system. Further, system 100 can utilize any type of duplexing such as FDD, TDD, etc. Pursuant to an illustration, base station 102 can transmit over forward links 118 and 124 to mobile devices 116 and 122. Moreover, mobile devices 116 and 122 can estimate respective forward link or downlink channels and generate corresponding feedback that can be provided to base station 102 via reverse links or uplinks 120 and 126.

Figure 2:
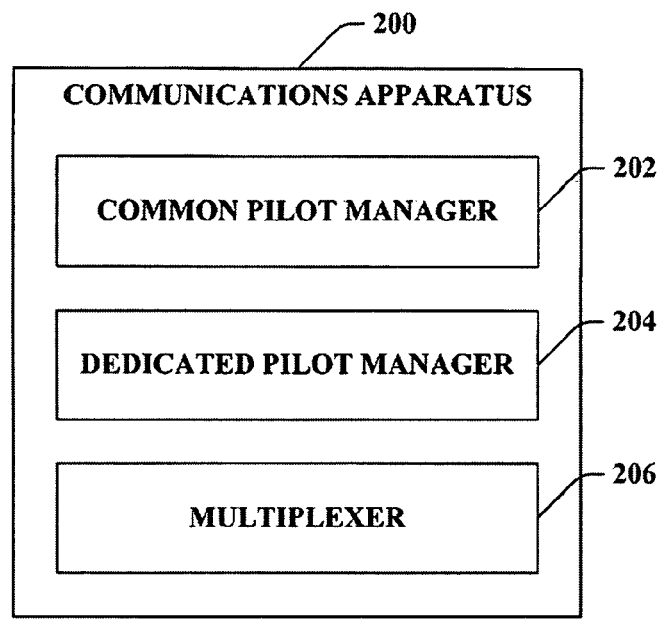
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof. In addition, communications apparatus 200 can be a mobile device or a portion thereof. Moreover, the communications apparatus 200 can be substantially any communications apparatus that receives data transmitted in a wireless communications environment. Communications apparatus 200 can send and received data transmission to and from other communications apparatus, base stations, mobile devices, etc. For example, communications apparatus 200 can include receiver and/or transmitter systems configured to communication in a wireless communications system. Communications apparatus 200 can employ wireless communication techniques such as, but not limited to, OFDMA, CDMA, TDMA, FDMA, 3GPP LTE techniques and the like.

The communications apparatus 200 can include a common pilot manager 202 that maintains common pilot symbols. According to an example, the common pilot symbols can be transmitted on a common pilot channel (CPICH) or other such channel. Pursuant to an illustration, the common pilot symbols include a known bit sequence. The known bit sequence enables receivers to detect phase of a signal that includes the common pilot symbols. In one aspect, the common pilot symbols can be employed to complete identification of a primary synchronization code. In addition, the common pilot symbols can be configured to transmit at a predetermined spreading code and spreading factor. For example, the common pilot symbols can have a spreading code of zero and a spreading factor of 256. Additionally, the common pilot symbols maintained by the common pilot manager 202 can be transmitted to all receivers in communication with the communications apparatus 200 (e.g., the symbols can be broadcasted).

The communications apparatus 200 can further include a dedicated pilot manager 204 that manages dedicated pilot symbols. Dedicated pilots are pilot signals maintained separately for each receiver in communication with the communications apparatus 200. The dedicated pilot symbols can be utilized, for example, by a receiver to perform a channel estimate. The communications apparatus 200 can include a multiplexer 206 that can combine or multiplex the common pilot symbols maintained by the common pilot manager 202 with the dedicated pilot symbols managed by the dedicated pilot manager 204. According to an aspect, the multiplexer 206 multiplexes the common pilot symbols and the dedicated pilot symbols within a same transmission time interval (TTI). Multiplexing common pilot symbols and dedicated pilot symbols within the same TTI enables both types of pilot symbols to be encapsulated in an independently decodable transmission. In other words, the common pilot symbols and dedicated pilot symbols are transmitted (e.g., encoded and interleaved) in a single data block that can be transmitted as a whole.

Moreover, although not shown, it is to be appreciated that communications apparatus 200 can include memory that retains instructions with respect to maintaining common pilot symbols, managing dedicated pilot symbols for one or more other apparatus, multiplexing common pilot symbols with dedicated pilot symbols in the same TTI, transmitting the multiplexed symbols, and the like. Further the memory can retain instructions for selecting a common pilot configuration, a dedicated pilot configuration or a hybrid pilot configuration. Further, communications apparatus 200 may include a processor that may be utilized in connection with executing instructions (e.g., instructions retained within memory, instructions obtained from a disparate source, . . . ).

Figure 3:
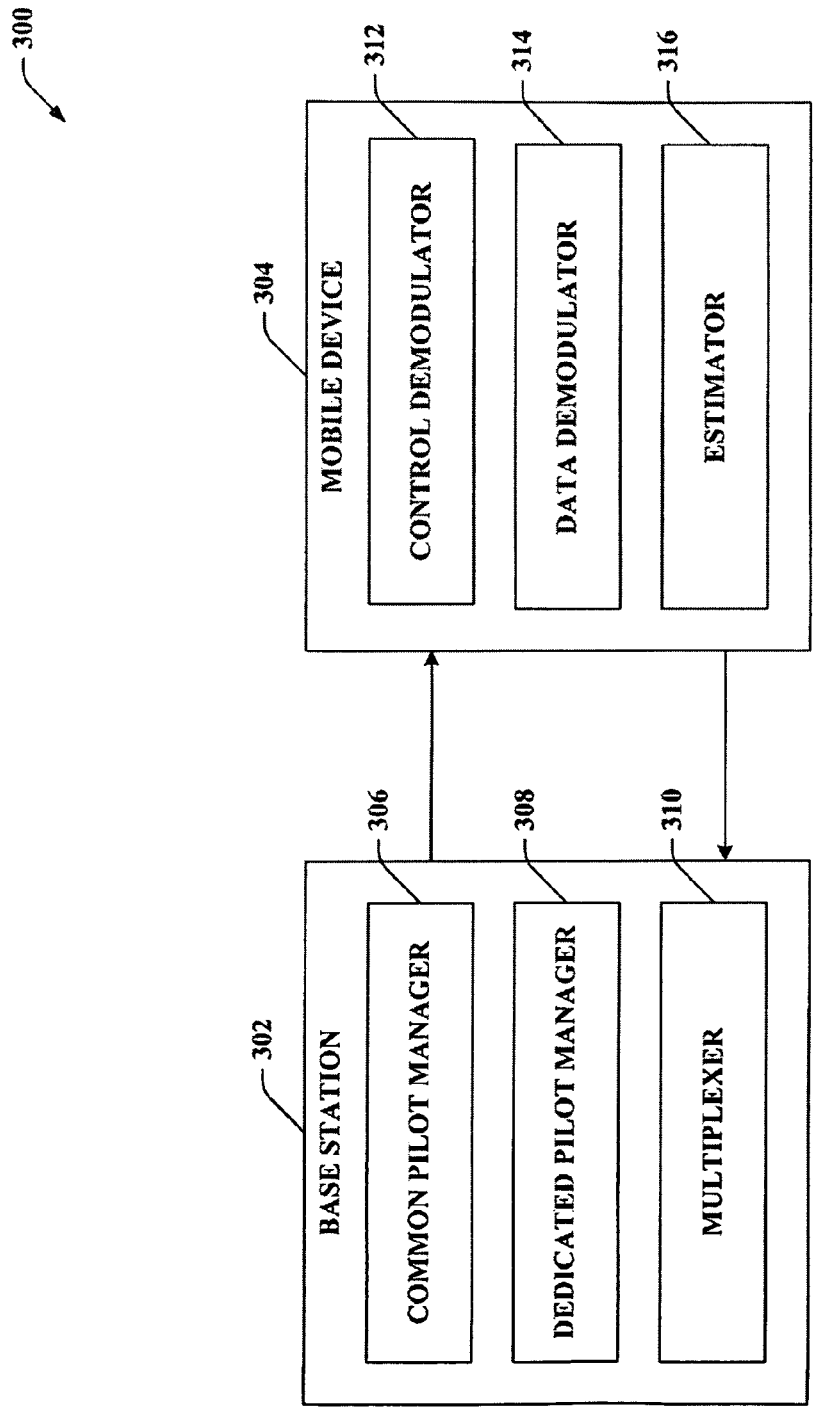
FIG. 3 is an illustration of an example wireless communications system that employs a hybrid pilot configuration according to an aspect.

Now referring to FIG. 3, illustrated is a wireless communications system 300 that can employ a hybrid pilot configuration in a communications network that can be subsequently utilized by receivers of the pilots. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a common pilot manager 306 that can maintain a set of common pilot symbols, a dedicated pilot manager 308 that can manage a plurality of sets of dedicated pilot symbols, and a multiplexer 310 that can multiplex common pilot symbols with dedicated pilot symbols in a single transmission time interval. In addition, mobile device 304 includes a control demodulator 312 that can utilize common pilot symbols to demodulate control channels, a data demodulator 314 that can employ dedicated pilot symbols to demodulate data channels, and an estimator 316 that can generate a channel estimate for the mobile device 304 based at least in part on transmission received from the base station 302.

According to an example, the base station 302 can transmit a signal to the mobile device 304 that includes a hybrid pilot configuration. The base station 302 includes the common pilot manager 306 that maintains a set of known bit sequences encapsulated in common pilot symbols. The base station 302 can employ a common pilot channel to broadcast common pilot symbols to mobile device 304 as well as any other mobile devices in communication with the base station 302. The base station 302 further includes the dedicated pilot manager 308 that manages dedicated pilot symbols. The dedicated pilot manger 308 maintains a distinct set of dedicated pilot symbols for mobile device 304 as well as other mobile devices (not shown) that communicate with the base station 302. The distinct set of dedicated pilot symbols enables the base station 302 to maintain a separate dedication pilot signal and/or channel with the mobile device 304. The multiplexer 310 the common pilot symbols and the dedicated pilot symbols within a same transmission time interval (TTI) prior to transmission of the data block comprising the TTI to the mobile device 304.

The mobile device 304, upon receiving the transmitted data block including multiplexed pilots, can utilize the pilot symbols to demodulate information and/or perform channel estimation. The mobile device 304 can deconstruct the TI to recover the common pilot symbols and the dedicated pilot symbols. For example, the mobile device 304 can include a demultiplexer (not shown). The common pilot symbols can be utilized by the control demodulator 312 to demodulate control channels such as, for example, the packed dedicated control channel. Since the control channels can span the entire bandwidth of the wireless communication system 300, the mobile device 304 relies upon the common pilot symbols to demodulate such channels. The dedicated pilot symbols included in the multiplexed transmission can be employed by the data demodulator 314 to demodulate data channels. Moreover, the data demodulator 314 can employ both the dedicated pilot symbols and the control pilot symbols to demodulate data channels. The data channels can include, but not limited to, the physical downlink shared channel. In one embodiment, the dedicated pilot symbols are precoded to enable the data demodulator 314 to coherently demodulate the data channels. In addition, according to an aspect, the common pilot symbols can include primitive precoding information to facilitate the control demodulator with coherently demodulating control channels. Further, both common pilot symbols and dedicated pilot symbols can be employed for precoding.

Those skilled in the art will appreciate that primitive precoding information can refer to, for example, any information, inference, or knowledge of the precoding used or applied to control, data, common or dedicated pilot channels. This precoding information includes, but is not limited to, precoding indexes or precoded signals. In the case of using a precoding index, precoding information can be used to augment channel estimation (e.g. using DPICH and CPICH). This can be done by performing the precoding of received CPICH signals, for example. The DPICH is assumed to be precoded at the transmitter side. In the case of using a precoding signal, the precoding information can be used from a precoded CPICH signal itself.

In another aspect, the mobile device can employ the multiplexed pilot symbols to perform a channel estimate. The estimator 316 can utilized the dedicated pilot symbols to generate a channel estimate of channel impulse response or other channel characteristics affected by radio transmissions (e.g., phase). According to an embodiment, the estimator 316 can augment the channel estimation by utilizing common pilot symbols as well as dedicated pilot symbols.

Figure 4:
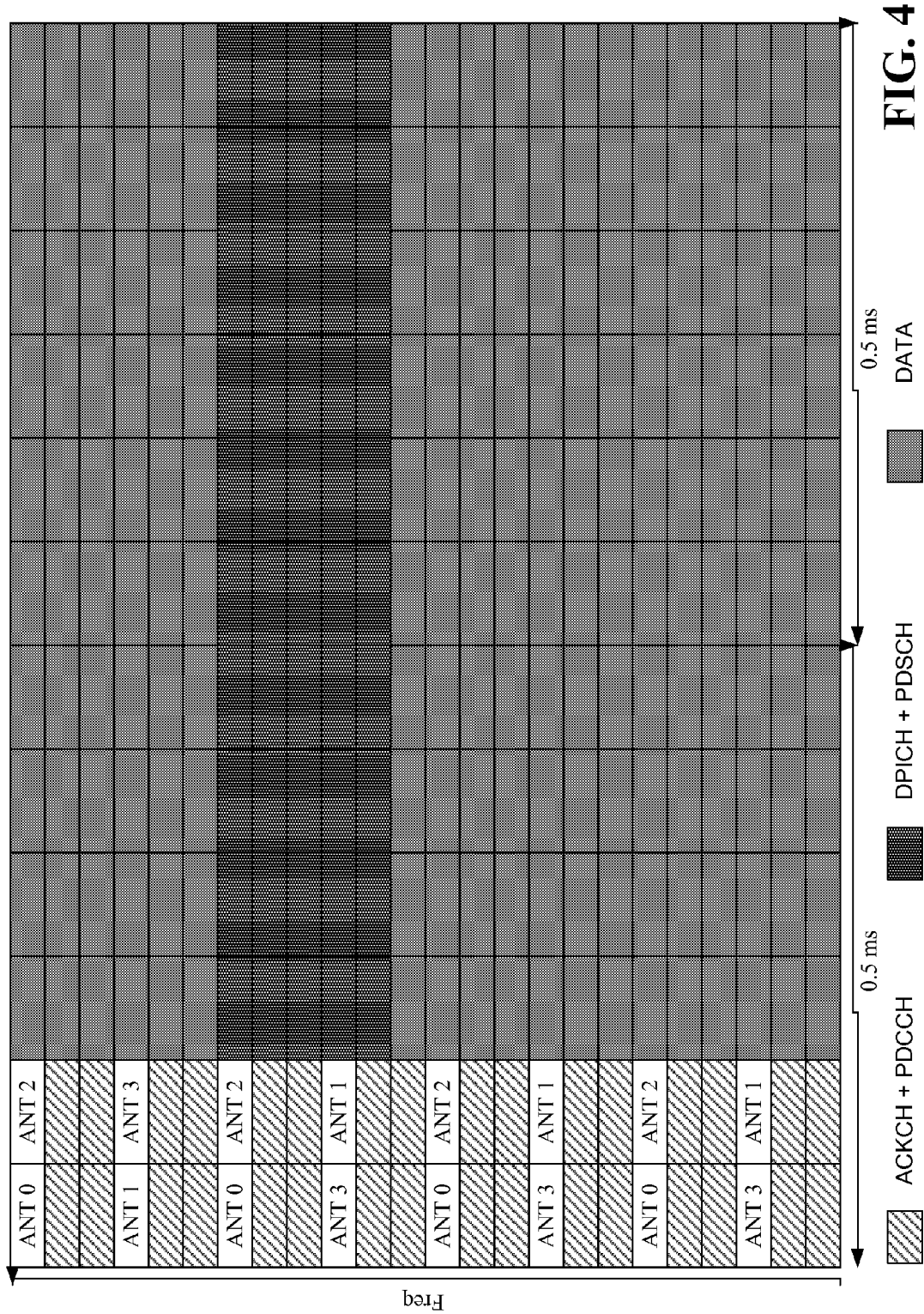
FIG. 4 is an illustration of an example resource mapping in accordance with an aspect of the subject disclosure.

Now referring to FIG. 4, a sample portion of bandwidth is shown represented as a plurality of time slots spanning a frequency; in one example, this can be a plurality of OFDM symbols 402, 404 (such as in a 3GPP or 3GPP LTE configuration, for example). As described previously, a portion of bandwidth can be reserved in a given time period for transmitting broadband pilot data. In this example, OFDM symbol 402 can be utilized to transmit such data. The other OFDM symbols 404 can be utilized for transmitting substantive data, control data (as shown), and/or substantially any other data. The sample shown can be repeated over time, for instance. In one example, the sample portion can be repeated every n milliseconds such that the broadband pilot channel is transmitted in each time slot (once every n milliseconds) followed by additional data. It is to be appreciated that not all devices transmitting broadband pilot data need to transmit such data in each time slot; rather, as described, devices can be assigned a periodicity for transmission based at least in part on scheduling needs and/or an activity level of the device.

According to an example, the bandwidth shown 400 can be across 0.5 ms in a 3GPP LTE configuration, for example, spanning a given frequency. Thus, there can be n OFDM symbols 402, 404 transmitted in 0.5 ms where one OFDM symbol 402 is dedicated to transmission of broadband pilot data, and the remaining n−1 OFDM symbols 404 are for transmitting additional data (shared data and control data). Devices having sufficient activity can be scheduled to transmit broadband pilot information; moreover, the devices can be assigned hopping patterns based at least in part on an activity level. The hopping pattern can specify when and where broadband pilot information is to be transmitted by a device. For example, in one instance, a device can require broadband pilot information transmission at 25 Hz, 50 Hz, 100 Hz, or 200 Hz, depending on the activity level. Additionally, the broadband pilot channel 402 can allow broadband pilot data to be multiplexed throughout the channel in 1 MHz resource blocks. In this regard, a device requiring 200 Hz periodicity for transmitting broadband pilot data can be assigned a hopping pattern transmitting data at every time slot (every 0.5 ms in this example). Conversely, a device requiring only 25 Hz periodicity for transmitting broadband pilot data can be assigned a hopping pattern transmitting data at every eighth time slot (every 4.0 ms in this example). In this way, the devices can be assigned hopping patterns to minimize collision and interference by evaluating other assigned hopping patterns.

Referring now to FIG. 4, an exemplary resource mapping is depicted in accordance with an aspect of the subject disclosure. For the purposes of simplicity of explanation, the example illustrates a resource block in the time and frequency dimensions that is equal in duration to one sub-frame or two slots of a transmission (e.g., 1 millisecond). Each block in the along the frequency axis represents a tone wherein the spacing between tones is dependent upon the cyclic prefix duration utilized. Each block along the time axis represents a symbol wherein the duration and number of symbols is also depends upon the cyclic prefix employed. It is to be appreciated that FIG. 4 is for illustrative purposes and the disclosed subject matter is not limited to the scope of this example. Those skilled in the art should appreciate how the resource mapping can be extended to systems including different number of antennas, varying tone spacing, sub-frame duration, etc.

In FIG. 4, one sub-frame (two slots) containing common pilot symbols and dedicated pilot symbols is illustrated. In this example, a 4 antenna MIMO system is provided. Common pilot symbols are shown mapped to particular antennas. In addition, the example involves transmissions on the acknowledgment channel (ACKCH) and the packet dedicated control channel (PDCCH) in the first symbols of the sub-frame. According to an aspect, the control channels are transmitted on frequencies spanning the entire bandwidth. In addition, FIG. 4 depicts transmissions on the dedicated pilot channel (DPICH) and the physical downlink shared channel (PDSCH). In an illustrative embodiment, dedicated pilot symbols are transmitted on the DPICH channel as indicated. Thus, common pilot symbols and dedicated pilot symbols are transmitted within the same TTI (e.g., sub-frame).

According to another aspect, regular common pilot channel (CPICH) symbols are sent in a preamble and/or midamble. Further, the symbols are transmitted are intended for CQI and MIMO support feedback channels. Pursuant to an illustration, the CPICH transmission can occur once every 5 ms. A mode of operation (common vs. dedicated) can indicated in a physical broadcast channel (P-BCH). The mode of operation utilizes, for example, at 1 to 2 bits of information PDCCH-CPICH can be employed to coherent demodulate PDCCH. In one embodiment, PDCCH can contain primitive precoding information. PDSCH-DPICH can be utilized to coherent demodulate PDSCH. In addition, DPICH can be precoded. A channel estimate can be augmented utilizing a combination of CPICH (using PDCCH info) and DPICH.

Figure 5:
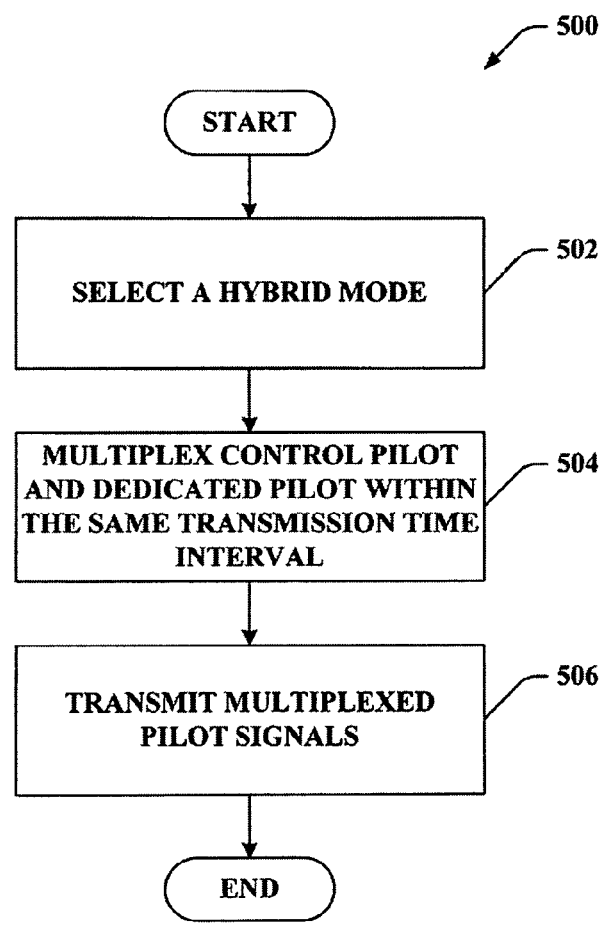
FIG. 5 is an illustration of an example methodology that facilitates employing a hybrid pilot mode in a wireless communications network.
Figure 6:
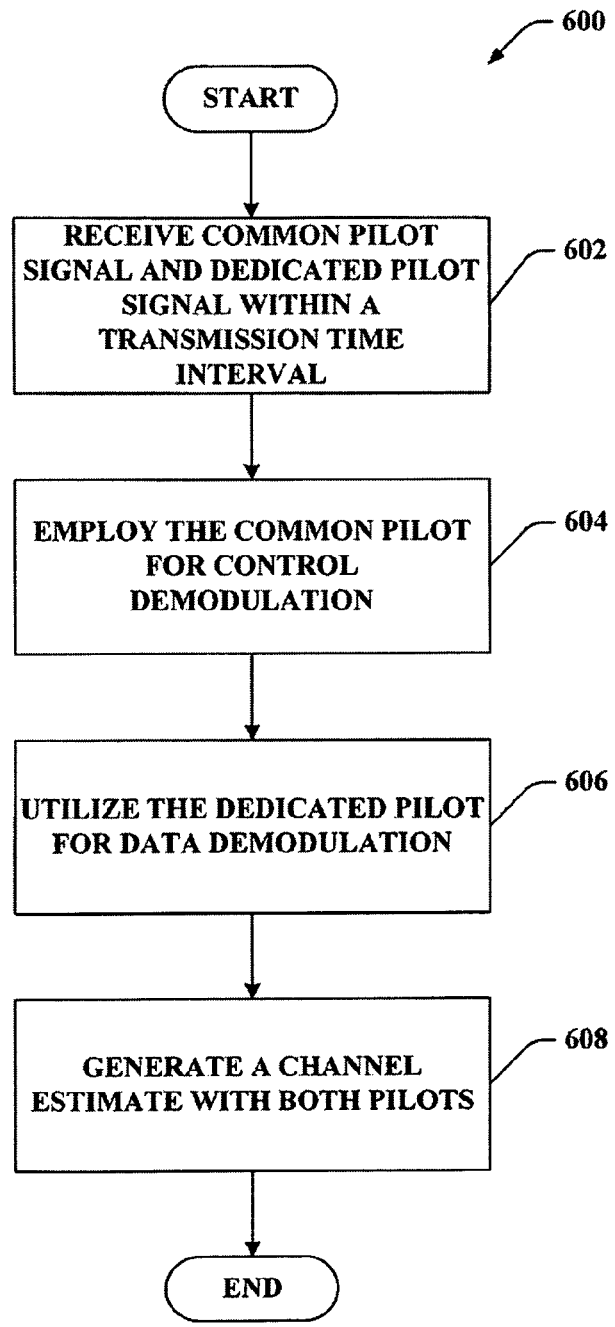
FIG. 6 is an illustration of an example methodology that utilizes hybrid pilot configurations in a wireless communications network.

Referring to FIGS. 5-6, methodologies relating to providing a hybrid pilot configuration in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with one or more embodiments.

Turning to FIG. 5, illustrated is a methodology 500 that facilitates employing a hybrid pilot mode in a wireless communications network. The methodology 500 can be performed by, for example, a base station. However, it is to be appreciated that the methodology 500 can be performed by other devices in the wireless communications network. At reference numeral 502, a hybrid mode is selected. The hybrid mode comprises a hybrid pilot configuration that includes both common pilot symbols and dedicated pilot symbols. A hybrid pilot configuration can be employed in place of a common mode wherein a common pilot is broadcasted to all mobile devices or a dedicated mode wherein separate dedicated pilots are maintained for each mobile device. At reference numeral 504, control pilot symbols and dedicated pilot symbols are multiplexed together within a transmission time interval. Multiplexing common pilot symbols and dedicated pilot symbols within the same TTI enables both types of pilot symbols to be encapsulated in an independently decodable transmission. In other words, the common pilot symbols and dedicated pilot symbols are transmitted (e.g., encoded and interleaved) in a single data block that can be transmitted as a whole. At reference numeral 506, the TTI including the multiplexed pilot signals is transmitted to at least one mobile device, for example.

Now referring to FIG. 6, a methodology 600 that facilitates utilizing hybrid pilot configurations in a wireless communications network is illustrated. The methodology 600 can be performed by, for example, a mobile device. However, it is to be appreciated that the methodology 600 can be performed by other devices in the wireless communications network. At reference numeral 602, a multiplexed signal is received. The multiplexed signal includes common pilot symbols and dedicated pilot symbols combined within a transmission time interval. At reference numeral 604, the common pilot symbols are employed for control demodulation. Control demodulation includes demodulating information on at least one control channel. At reference numeral 606, dedicated pilot symbols are utilized for data demodulation. Data demodulation includes demodulating information on at least one data channel. At reference numeral 608, a channel estimate is generated. According to an aspect, the channel estimate can be generated by employing the dedicated pilot symbols, the common pilot symbols or a combination thereof.

It will be appreciated that, in accordance with one or more aspects described herein, inferences can be made regarding employing a hybrid pilot configuration in a wireless communications network as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to employing a hybrid pilot configuration. For example, a channel estimate can be generated based on inferences made regarding past channel estimates, such as the manner in which augmenting an estimate with common pilot symbols affects the estimate. Additionally, inferences can be made with respect to determining whether common pilot symbols should be employed in combination with dedicated pilot symbols in demodulating data channels and/or generating a channel estimate.

Figure 7:
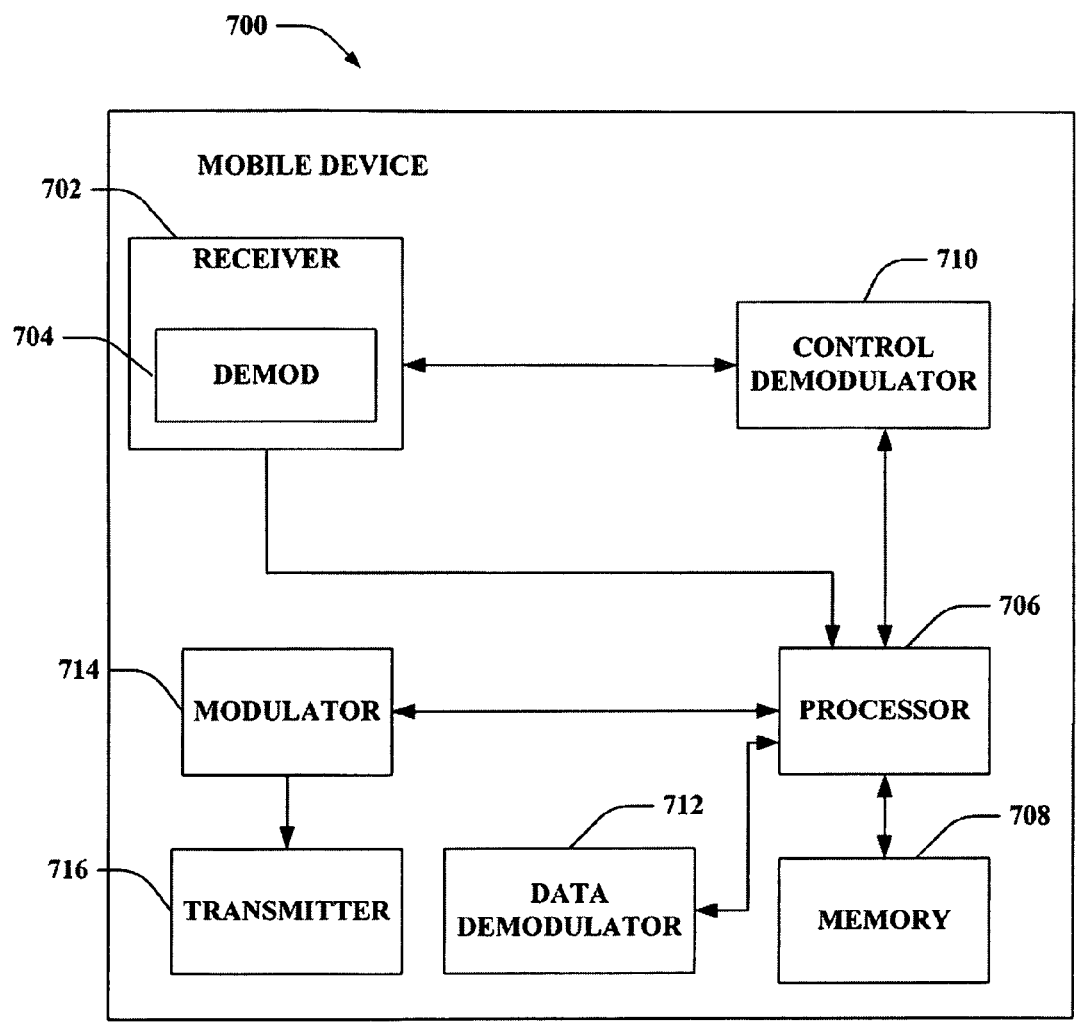
FIG. 7 is an illustration of an example mobile device that facilitates utilizing a hybrid pilot configuration transmitted by a base station.

FIG. 7 is an illustration of a mobile device 700 that facilitates utilizing a hybrid pilot configuration transmitted by a base station. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a control demodulator 710 that can utilize common pilot symbols to demodulate control channels as described supra, for instance. In one example, the common pilot symbols can be utilized by the control demodulator 700 to demodulate control channels such as, for example, the packed dedicated control channel. Since the control channels can span the entire bandwidth of the wireless communication system, the mobile device 700 relies upon the common pilot symbols to demodulate such channels. The processor 706 can also be operatively coupled to a data demodulator 712 that can employ dedicated pilot symbols to demodulate data channels. Moreover, the data demodulator 712 can employ both the dedicated pilot symbols and the control pilot symbols to demodulate data channels. The data channels can include, but not limited to, the physical downlink shared channel. Mobile device 700 still further comprises a modulator 714 and transmitter 716 that respectively modulate and transmit signals to, for instance, a base station, another mobile device, etc. Although depicted as being separate from the processor 706, it is to be appreciated that the control demodulator 710, data demodulator 712, demodulator 704, and/or modulator 714 can be part of the processor 706 or multiple processors (not shown).

Figure 8:
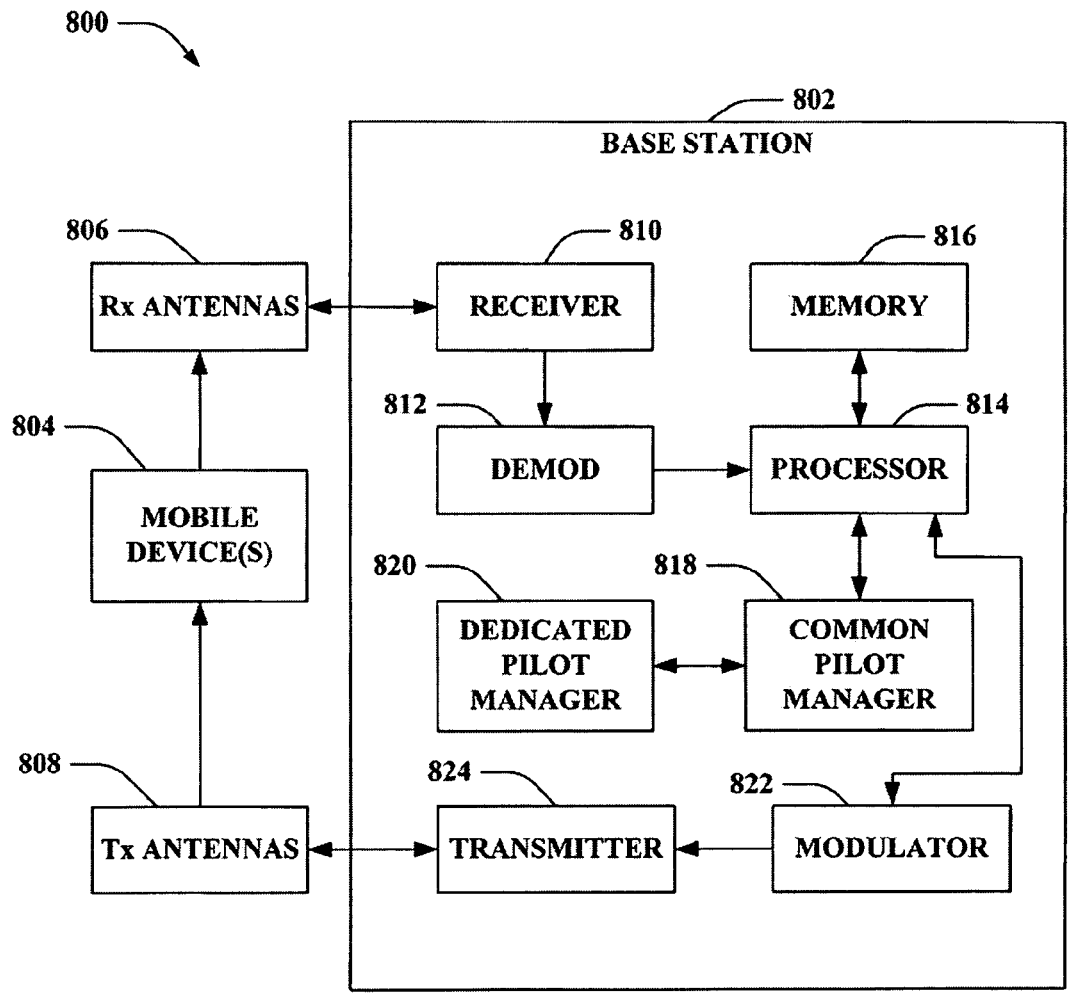
FIG. 8 is an illustration of an example system that facilitates creating and employing hybrid pilot configuration in a wireless communication network.

FIG. 8 is an illustration of a system 800 that facilitates creating and employing hybrid pilot configuration in a wireless communication network as described supra. The system 800 comprises a base station 802 (e.g., access point, ... ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a common pilot manager 818 that can maintains common pilot symbols to be transmitted to mobile devices 804. Moreover, the processor 814 can be coupled to a dedicated pilot manager 820 that can that manages dedicated pilot symbols for a set of dedicated pilots that includes a individual dedicated pilots for each mobile device of mobile device 804.

According to an example, the base station 802 can include a set of known bit sequences encapsulated in common pilot symbols maintained by the common pilot manager 818. The base station 802 can employ a common pilot channel to broadcast common pilot symbols to mobile devices 804. The dedicated pilot manger 820 maintains a distinct set of dedicated pilot symbols for mobile devices 804. The distinct set of dedicated pilot symbols enables the base station 802 to maintain a separate dedication pilot signal and/or channel with the mobile devices 804. The base station 802 can multiplex the common pilot symbols and the dedicated pilot symbols within a same transmission time interval (TTI) prior to transmission of the data block comprising the TTI to the mobile devices 804 by the transmitter 824. Furthermore, although depicted as being separate from the processor 814, it is to be appreciated that the common pilot manager 818, dedicated pilot manager 820, demodulator 812, and/or modulator 822 can be part of the processor 814 or multiple-processors (not shown).

Figure 9:
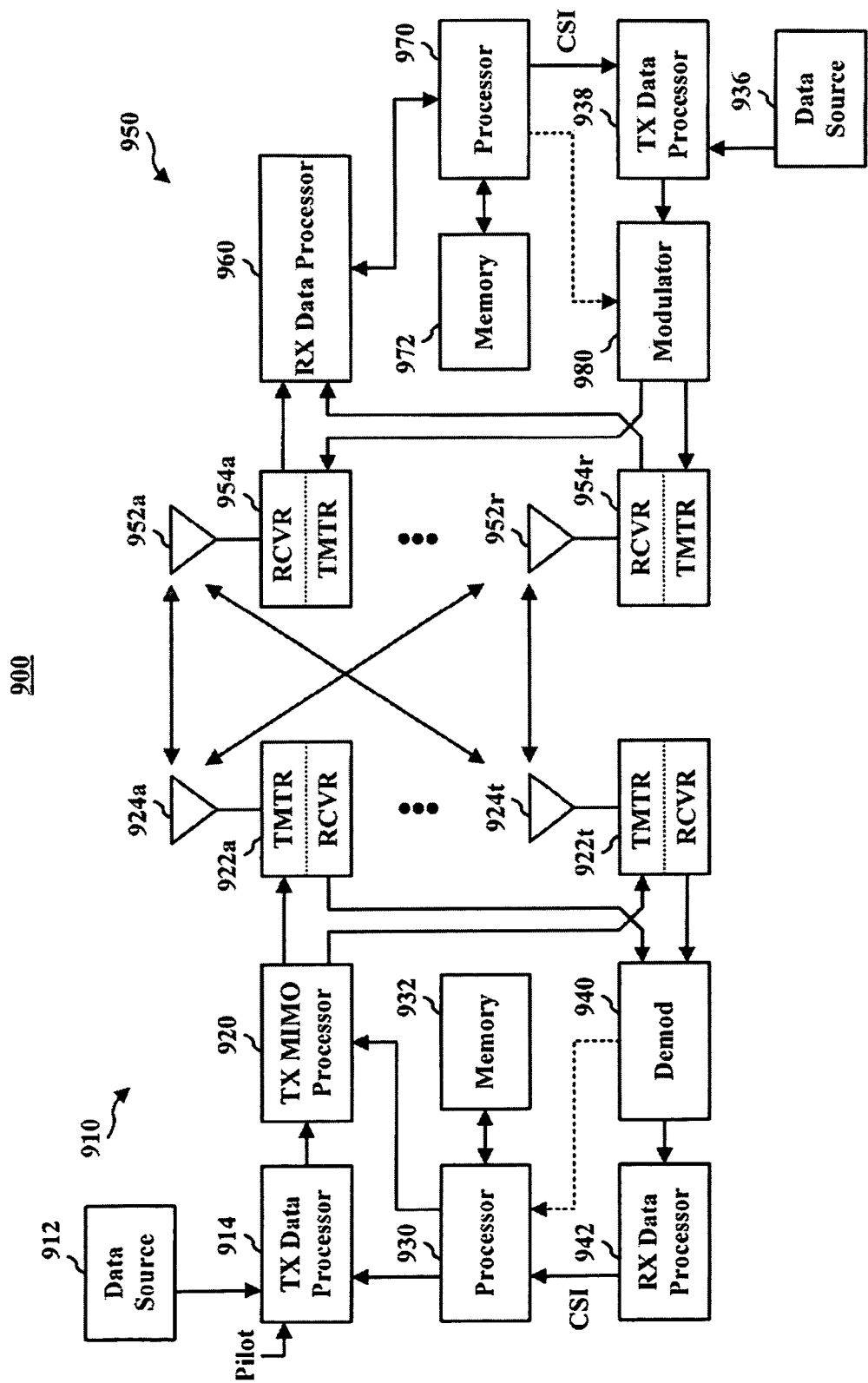
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which preceding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
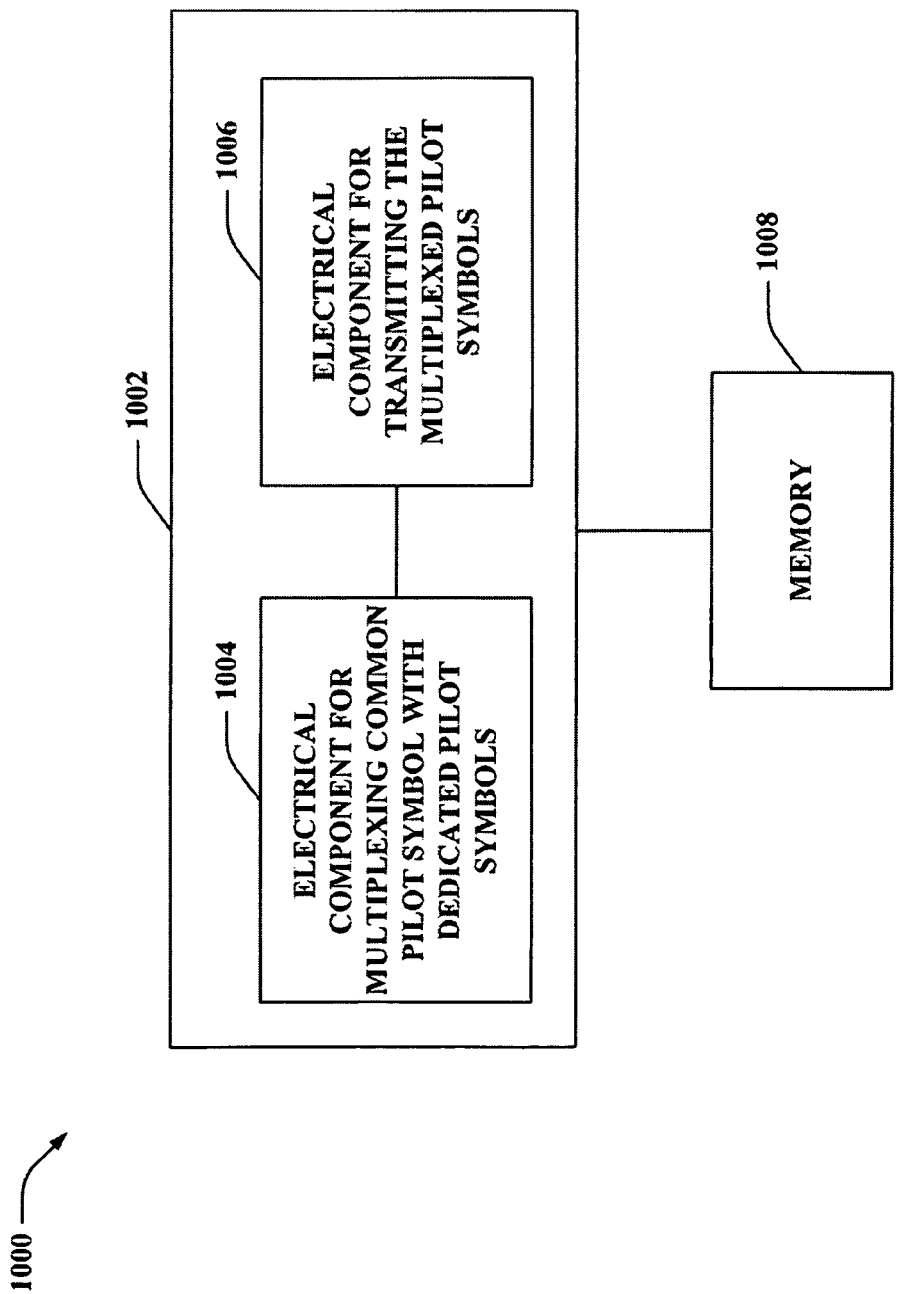
FIG. 10 is an illustration of an example system that generates a hybrid pilot configuration.

With reference to FIG. 10, illustrated is a system 1000 that generates a hybrid pilot configuration. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for multiplexing common pilot symbols with dedicated pilot symbols 1004. For example, the common pilot symbols and dedicated pilot symbols can be multiplexed within a single transmission time interval for transmission to a device as a encapsulated data block. Further, logical grouping 1002 can comprise an electrical component for transmitting the multiplexed pilot symbols 1006. For example, common pilot symbols are typically transmitted on a common pilot channel to all devices in communication (e.g., broadcasted). In addition, dedicated pilot symbols are typically sent on a dedicated pilot channel that is separately maintained for each device in communication. According to an aspect, both pilot symbols are multiplexed and transmitted in the same TTI. Additionally, system 1000 can include a memory 1008 that retains instructions for executing functions associated with electrical components 1004 and 1006. While shown as being external to memory 1008, it is to be understood that one or more of electrical components 1004 and 1006 can exist within memory 1010.

Figure 11:
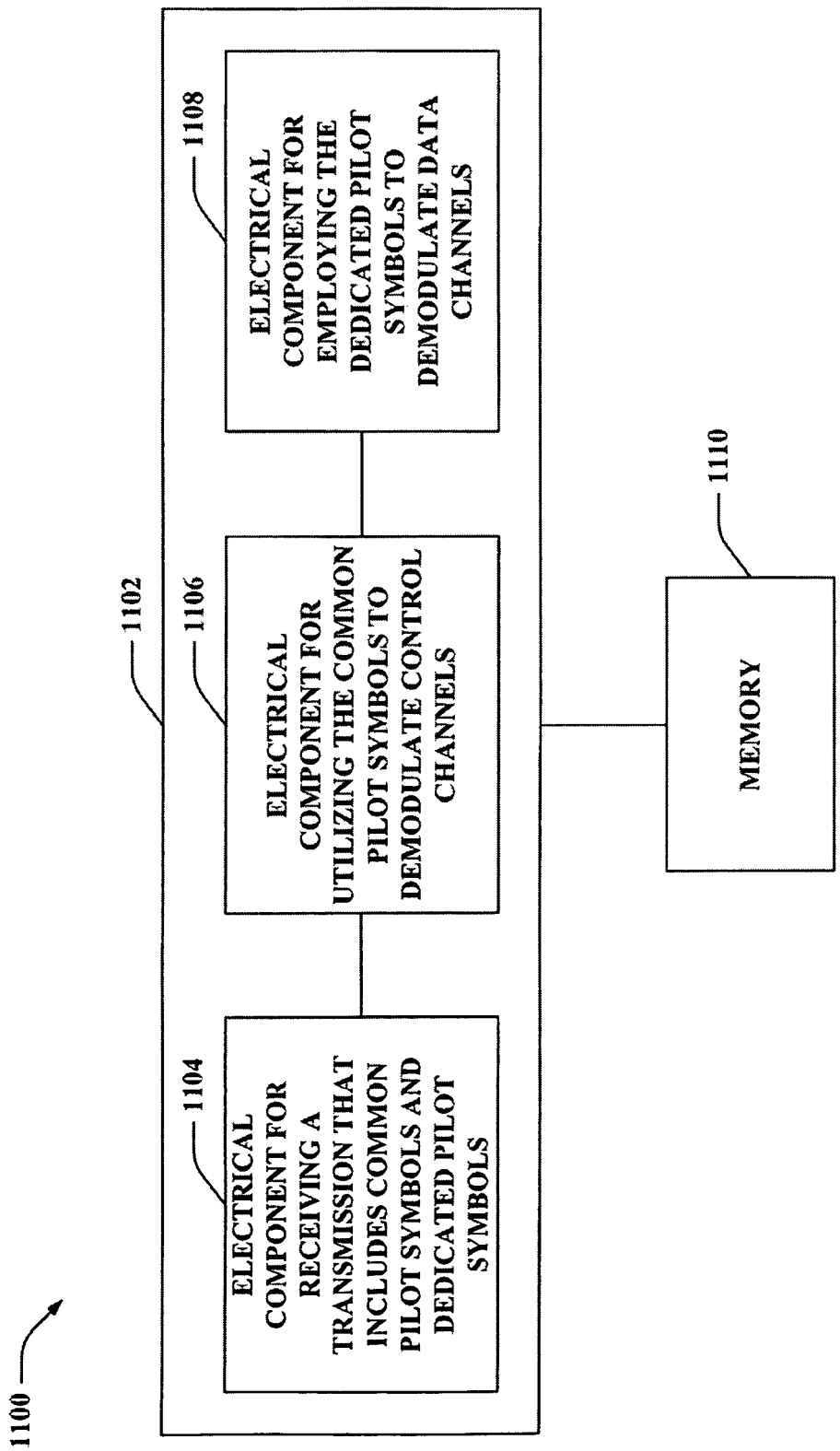
FIG. 11 is an illustration of an example system that utilizes a hybrid pilot configuration.

Turning to FIG. 11, illustrated is a system 1100 that utilizes a hybrid pilot configuration in a wireless communications network. System 1100 can reside within a base station, mobile device, etc., for instance. As depicted, system 1100 includes functional blocks that can represent functions implemented by a processor, software, or combination thereof (e.g., firmware). System 100 includes a logical grouping 1102 of electrical components that facilitate communicating broadband pilot signals according to a hopping pattern. Logical grouping 1102 can include an electrical component for receiving a transmission that includes common pilot symbols and dedicated pilot symbols 1104. Pursuant to an example, the common pilot symbols and dedicated pilot symbols can be multiplexed together in a transmission time interval. Moreover, logical grouping 1102 can include an electrical component for utilizing the common pilot symbols to demodulate control channels 1106. According to an aspect, control channels can span an entire bandwidth of the wireless communications network. Further, logical grouping 1102 can comprise an electrical component for employing the dedicated pilot symbols to demodulate data channels 1108. Further, the electrical component 1108 can augment demodulation of data channels by utilizing common pilot symbols as well. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for utilizing hybrid pilot mode in a wireless communications network, comprising:
   receiving a transmission in a transmission time interval by a receiver entity that includes multiplexed common pilot symbols corresponding to a common pilot channel and dedicated pilot symbols corresponding to a dedicated pilot channel, wherein the common pilot channel is combined with at least one control channel in the transmission time interval, wherein the dedicated pilot channel is combined with at least one data channel in the transmission time interval, and wherein the at least one control channel comprises a packet dedicated control channel;
   utilizing the common pilot symbols to demodulate control signals on the at least one control channel;
   employing the dedicated pilot symbols to demodulate data signals on the at least one data channel;
   utilizing the dedicated pilot symbols to generate a channel estimate; and
   augmenting the channel estimate by utilizing a combination of the dedicated pilot channel and the common pilot channel, using packet dedicated control channel information;
   wherein the common pilot symbols include primitive precoding information, wherein the packet dedicated control channel comprises the primitive precoding information, wherein the primitive precoding information is itself precoded, and wherein the dedicated pilot symbols are precoded.

2. The method of claim 1, further comprising utilizing both the dedicated pilot symbols and the common pilot symbols to demodulate data signals.

3. The method of claim 1, wherein:
   the common pilot channel and the at least one control channel are transmitted in a first plurality of symbols of the transmission time interval over a first bandwidth;
   the dedicated pilot channel and the at least one data channel are transmitted in a second plurality of symbols of the transmission time interval over a second bandwidth; and
   the second bandwidth is narrower than the first bandwidth.

4. The method of claim 1, wherein the at least one control channel includes a packet dedicated control channel.

5. The method of claim 1, wherein the at least one data channel includes a physical downlink shared channel.

6. The method of claim 1, wherein the common pilot symbols are also employed to demodulate data signals on at least one data channel.

7. The method of claim 1, wherein the common pilot symbols are sent in one of a preamble or a midamble.

8. A wireless communications apparatus, comprising:
   a memory that retains instructions related to receiving a transmission in a transmission time interval that includes multiplexed common pilot symbols corresponding to a common pilot channel and dedicated pilot symbols corresponding to a dedicated pilot channel, wherein the common pilot channel is combined with at least one control channel in the transmission time interval, wherein the at least one control channel comprises a packet dedicated control channel, wherein the packet dedicated control channel comprises primitive precoding information, and wherein the dedicated pilot channel is combined with at least one data channel in the transmission time interval, the instructions being additionally related to utilizing the common pilot symbols to demodulate control signals on the at least one control channel, employing the dedicated pilot symbols to demodulate data signals on the at least one data channel, utilizing the dedicated pilot symbols to generate a channel estimate, and augmenting the channel estimate by utilizing a combination of the dedicated pilot channel and the common pilot channel, using packet dedicated control channel information; and
   a processor coupled to the memory configured to execute the instructions retained in the memory;
   wherein the common pilot symbols include primitive precoding information, wherein the primitive precoding information is itself precoded, and wherein the dedicated pilot symbols are precoded.

9. The wireless communications apparatus of claim 8, the memory further retains instructions for utilizing both the dedicated pilot symbols and the common pilot symbols to demodulate data signals.

10. The wireless communications apparatus of claim 8, wherein the at least one control channel span the entire bandwidth.

11. The wireless communications apparatus of claim 8, wherein the at least one control channel includes a packet dedicated control channel.

12. The wireless communications apparatus of claim 8, wherein the at least one data channel includes a physical downlink shared channel.

13. A wireless communications apparatus that facilitates utilizing a hybrid pilot mode in a wireless communications network, comprising:
means for receiving a transmission in a transmission time interval that includes multiplexed common pilot symbols corresponding to a common pilot channel and dedicated pilot symbols corresponding to a dedicated pilot channel, wherein the common pilot channel is combined with at least one control channel in the transmission time interval, wherein the dedicated pilot channel is combined with at least one data channel in the transmission time interval, and wherein the at least one control channel comprises a packet dedicated control channel;
means for utilizing the common pilot symbols to demodulate control signals on the at least one control channel;
means for employing the dedicated pilot symbols to demodulate data signals on the at least one data channel;
means for utilizing the dedicated pilot symbols to generate a channel estimate; and
means for augmenting the channel estimate by utilizing a combination of the dedicated pilot channel and the common pilot channel, using packet dedicated control channel information;
wherein the common pilot symbols include primitive precoding information, wherein the packet dedicated control channel comprises the primitive precoding information, wherein the primitive precoding information is itself precoded, and wherein the dedicated pilot symbols are precoded.

14. The wireless communications apparatus of claim 13, further comprising means for utilizing both the dedicated pilot symbols and the common pilot symbols to demodulate data signals.

15. The wireless communications apparatus of claim 13, wherein the at least one control channel spans the entire bandwidth.

16. The wireless communications apparatus of claim 13, wherein the at least one control channel includes a packet dedicated control channel.

17. The wireless communications apparatus of claim 13, wherein the at least one data channel includes a physical downlink shared channel.

18. A non-transitory machine-readable medium having stored thereon machine-executable instructions for execution by a computer processor comprising:
receiving a transmission in a transmission time interval that includes multiplexed common pilot symbols corresponding to a common pilot channel and dedicated pilot symbols corresponding to a dedicated pilot channel, wherein the common pilot channel is combined with at least one control channel in the transmission time interval, wherein the dedicated pilot channel is combined with at least one data channel in the transmission time interval, and wherein the at least one control channel comprises a packet dedicated control channel;
utilizing the common pilot symbols to demodulate control signals on the at least one control channel;
employing the dedicated pilot symbols to demodulate data signals on the at least one data channel;
utilizing the dedicated pilot symbols to generate a channel estimate; and
augmenting the channel estimate by utilizing a combination of the dedicated pilot channel and the common pilot channel, using packet dedicated control channel information;
wherein the common pilot symbols include primitive precoding information, wherein the packet dedicated control channel comprises the primitive precoding information, wherein the primitive precoding information is itself precoded, and wherein the dedicated pilot symbols are precoded.

19. The non-transitory machine-readable medium of claim 18, further comprising machine-readable instructions for utilizing both the dedicated pilot symbols and the common pilot symbols to demodulate data signals.

20. The non-transitory machine-readable medium of claim 18, wherein the at least one control channel spans the entire bandwidth.

21. The non-transitory machine-readable medium of claim 18, wherein the at least one control channel includes a packet dedicated control channel.

22. The non-transitory machine-readable medium of claim 18, wherein the at least one data channel includes a physical downlink shared channel.

23. In a wireless communication system, an apparatus comprising:
an integrated circuit configured to:
receive a transmission in a transmission time interval that includes multiplexed common pilot symbols corresponding to a common pilot channel and dedicated pilot symbols corresponding to a dedicated pilot channel, wherein the common pilot channel is combined with at least one control channel in the transmission time interval, wherein the dedicated pilot channel is combined with at least one data channel in the transmission time interval, and wherein the at least one control channel comprises a packet dedicated control channel;
utilize the common pilot symbols to demodulate control signals on the at least one control channel;
employ the dedicated pilot symbols to demodulate data signals on the at least one data channel;
utilize the dedicated pilot symbols to generate a channel estimate; and
augment the channel estimate by utilizing a combination of the dedicated pilot channel and the common pilot channel, using packet dedicated control channel information;
wherein the common pilot symbols include primitive precoding information, wherein the packet dedicated control channel comprises the primitive precoding information, wherein the primitive precoding information is itself precoded, and wherein the dedicated pilot symbols are precoded.

24. A method for employing a hybrid pilot mode in a wireless communications network, comprising:
multiplexing common pilot symbols corresponding to a common pilot channel with dedicated pilot symbols corresponding to a dedicated pilot channel in a transmission time interval, wherein the common pilot channel is combined with at least one control channel in the transmission time interval, and wherein the dedicated pilot channel is combined with at least one data channel in the transmission time interval; and transmitting the multiplexed pilot symbols to at least one mobile device, wherein the common pilot channel and the at least one control channel are transmitted in a first plurality of symbols of the transmission time interval over a first bandwidth, wherein the dedicated pilot channel and the at least one data channel are transmitted in a second plurality of symbols of the transmission time interval over a second bandwidth, and wherein the second bandwidth is narrower than the first bandwidth;

wherein the common pilot symbols include primitive precoding information, wherein the primitive precoding information is itself precoded, and wherein the dedicated pilot symbols are precoded.

25. The method of claim 24, further comprising transmitting the common pilot symbols on the common pilot channel.

26. The method of claim 24, further comprising transmitting the dedicated pilot symbols on the dedicated pilot channel corresponding to the at least one mobile device.

27. A wireless communications apparatus, comprising:

a memory that retains instructions related to multiplexing common pilot symbols corresponding to a common pilot channel with dedicated pilot symbols corresponding to a dedicated pilot channel in a transmission time interval and transmitting the multiplexed pilot symbols to at least one mobile device, wherein the common pilot channel is combined with at least one control channel in the transmission time interval, wherein the dedicated pilot channel is combined with at least one data channel in the transmission time interval, wherein the common pilot channel and the at least one control channel are transmitted in a first plurality of symbols of the transmission time interval over a first bandwidth, wherein the dedicated pilot channel and the at least one data channel are transmitted in a second plurality of symbols of the transmission time interval over a second bandwidth, and wherein the second bandwidth is narrower than the first bandwidth; and a processor coupled to the memory configured to execute the instructions retained in the memory;

wherein the common pilot symbols include primitive precoding information, wherein the primitive precoding information is itself precoded, and wherein the dedicated pilot symbols are precoded.

28. The wireless communications apparatus of claim 27, wherein the memory further retains instructions for transmitting the common pilot symbols on the common pilot channel.

29. The wireless communications apparatus of claim 27, wherein the memory further retains instructions for transmitting the dedicated pilot symbols on the dedicated pilot channel corresponding to the at least one mobile device.

30. A wireless communications apparatus that facilitates employing a hybrid pilot mode in a wireless communications network, comprising:

means for multiplexing common pilot symbols corresponding to a common pilot channel with dedicated pilot symbols corresponding to a dedicated pilot channel in a transmission time interval, wherein the common pilot channel is combined with at least one control channel in the transmission time interval, and wherein the dedicated pilot channel is combined with at least one data channel in the transmission time interval; and means for transmitting the multiplexed pilot symbols to at least one mobile device, wherein the common pilot channel and the at least one control channel are transmitted in a first plurality of symbols of the transmission time interval over a first bandwidth, wherein the dedicated pilot channel and the at least one data channel are transmitted in a second plurality of symbols of the transmission time interval over a second bandwidth, and wherein the second bandwidth is narrower than the first bandwidth;

wherein the common pilot symbols include primitive precoding information, wherein the primitive precoding information is itself precoded, and wherein the dedicated pilot symbols are precoded.

31. The wireless communications apparatus of claim 30, further comprising means for transmitting the common pilot symbols on the common pilot channel.

32. The wireless communications apparatus of claim 30, further comprising means for transmitting the dedicated pilot symbols on the dedicated pilot channel corresponding to the at least one mobile device.

33. A non-transitory machine-readable medium having stored thereon machine-executable instructions for execution by a computer processor comprising:

multiplexing common pilot symbols corresponding to a common pilot channel with dedicated pilot symbols corresponding to a dedicated pilot channel in a transmission time interval, wherein the common pilot channel is combined with at least one control channel in the transmission time interval, and wherein the dedicated pilot channel is combined with at least one data channel in the transmission time interval; and transmitting the multiplexed pilot symbols to at least one mobile device, wherein the common pilot channel and the at least one control channel are transmitted in a first plurality of symbols of the transmission time interval over a first bandwidth, wherein the dedicated pilot channel and the at least one data channel are transmitted in a second plurality of symbols of the transmission time interval over a second bandwidth, and wherein the second bandwidth is narrower than the first bandwidth;

wherein the common pilot symbols include primitive precoding information, wherein the primitive precoding information is itself precoded, and wherein the dedicated pilot symbols are precoded.

34. The non-transitory machine-readable medium of claim 33, further comprising instructions for transmitting the common pilot symbols on the common pilot channel.

35. The non-transitory machine-readable medium of claim 33, further comprising instructions for transmitting the dedicated pilot symbols on the dedicated pilot channel corresponding to the at least one mobile device.

36. In a wireless communication system, an apparatus comprising:

an integrated circuit configured to:

multiplex common pilot symbols corresponding to a common pilot channel with dedicated pilot symbols corresponding to a dedicated pilot channel in a transmission time interval, wherein the common pilot channel is combined with at least one control channel in the transmission time interval, and wherein the dedicated pilot channel is combined with at least one data channel in the transmission time interval; and transmit the multiplexed pilot symbols to at least one mobile device, wherein the common pilot channel and the at least one control channel are transmitted in a first plurality of symbols of the transmission time interval over a first bandwidth, wherein the dedicated pilot channel and the at least one data channel are transmitted in a second plurality of symbols of the transmission time interval over a second bandwidth, and wherein the second bandwidth is narrower than the first bandwidth;

wherein the common pilot symbols include primitive precoding information, wherein the primitive precoding information is itself precoded, and wherein the dedicated pilot symbols are precoded.

* * * * *